Nov. 19, 1963    H. W. BAER    3,111,231
ARTICLE HANDLING APPARATUS
Filed Feb. 10, 1961    4 Sheets-Sheet 1
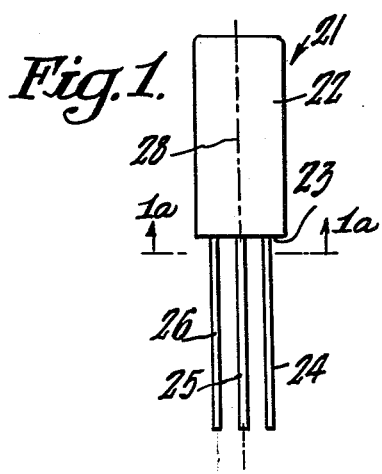
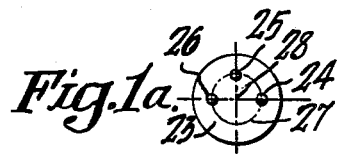
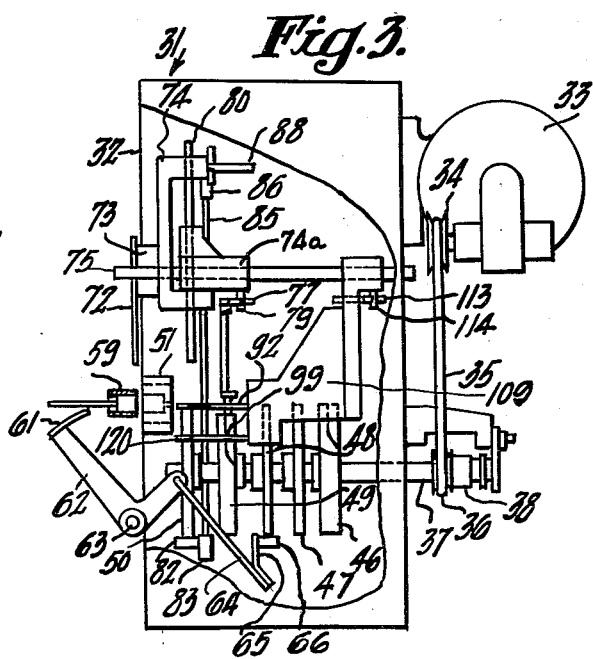
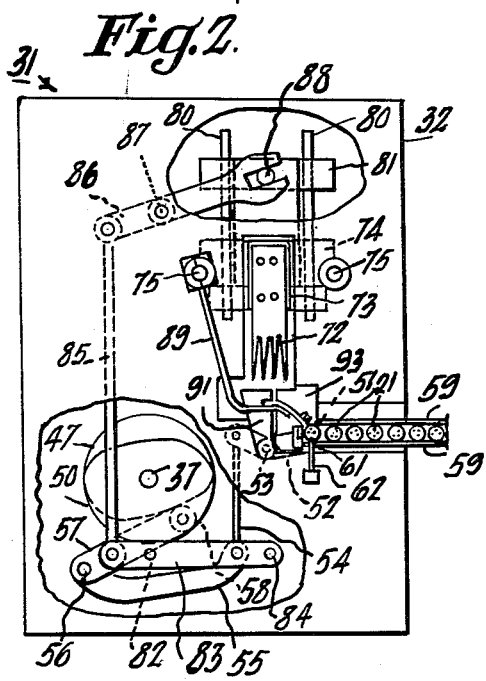
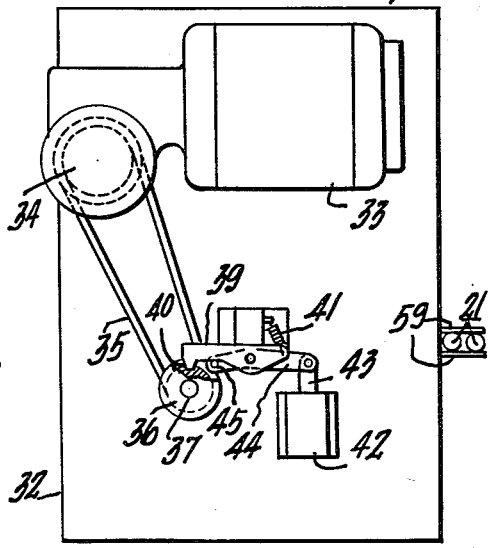
INVENTOR.
Herman W. Baer
BY
W. S. Hill
AGENT

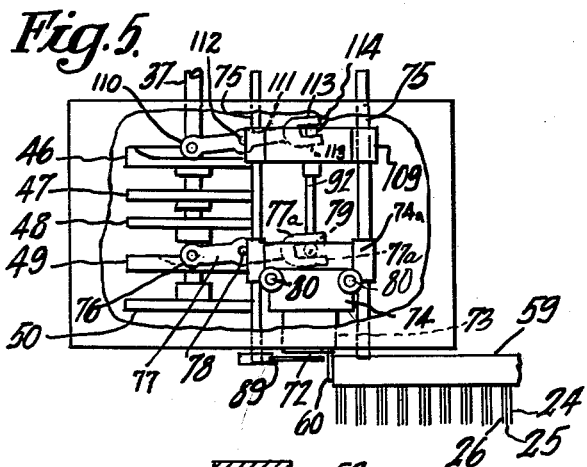
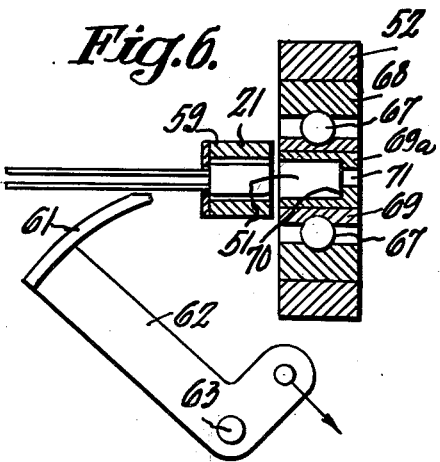
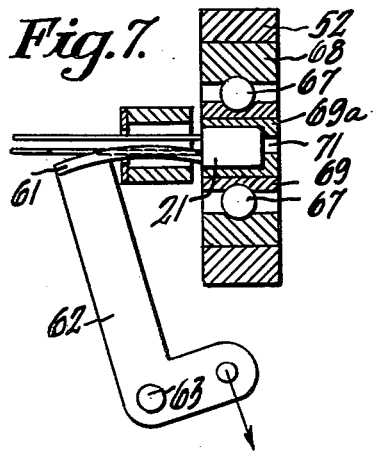
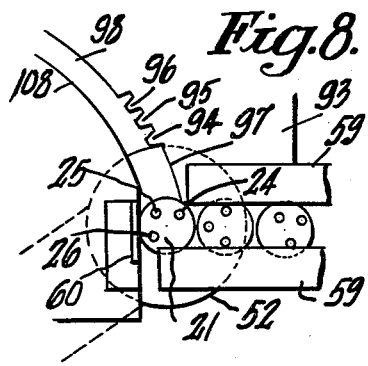
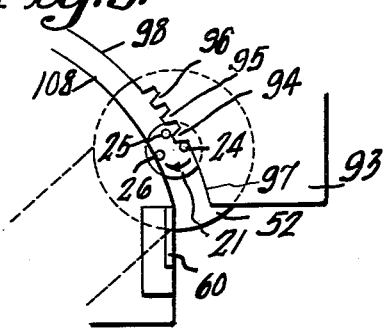
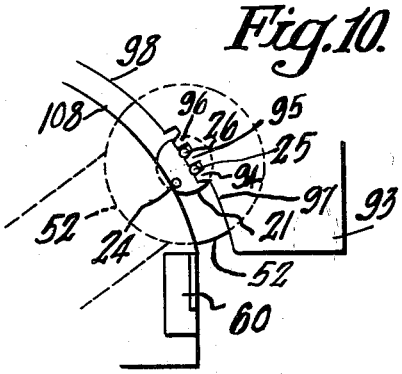

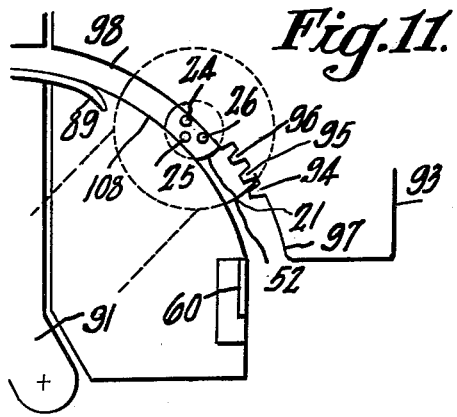
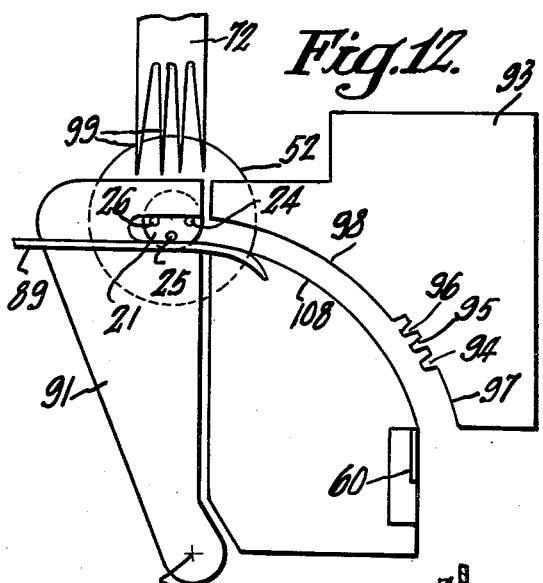
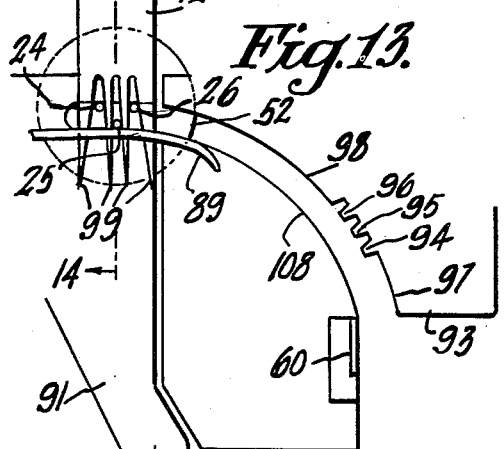
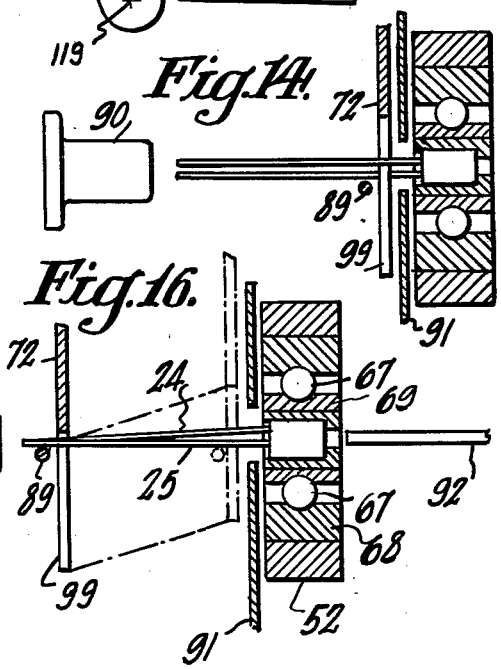
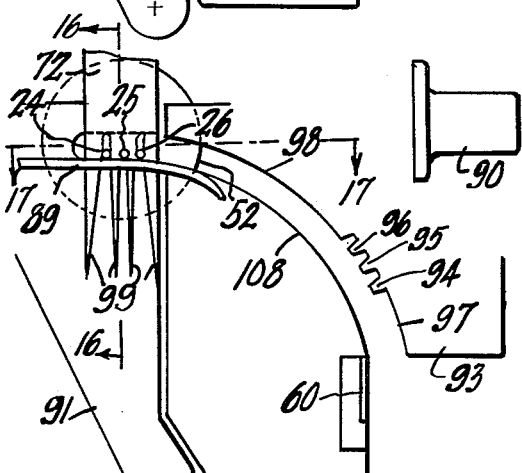
INVENTOR.
Herman W. Baer
BY
W.S. Hill
AGENT

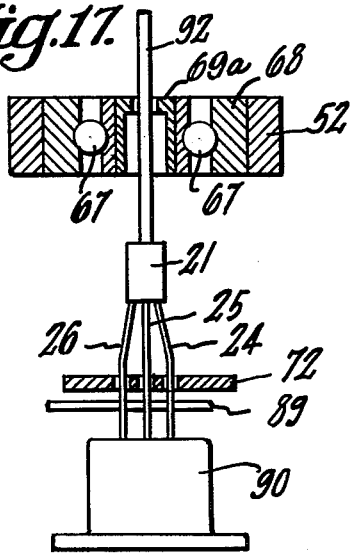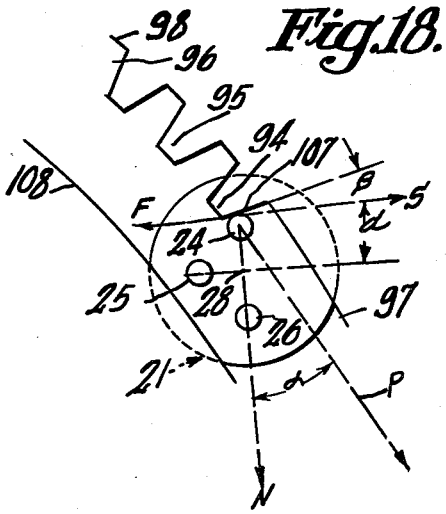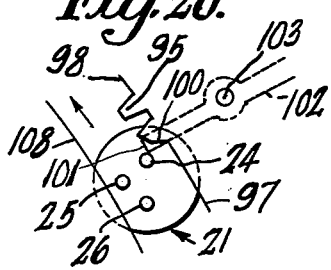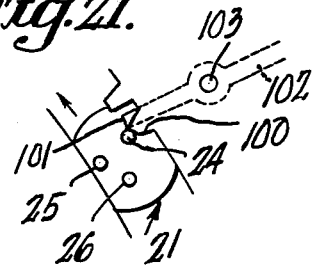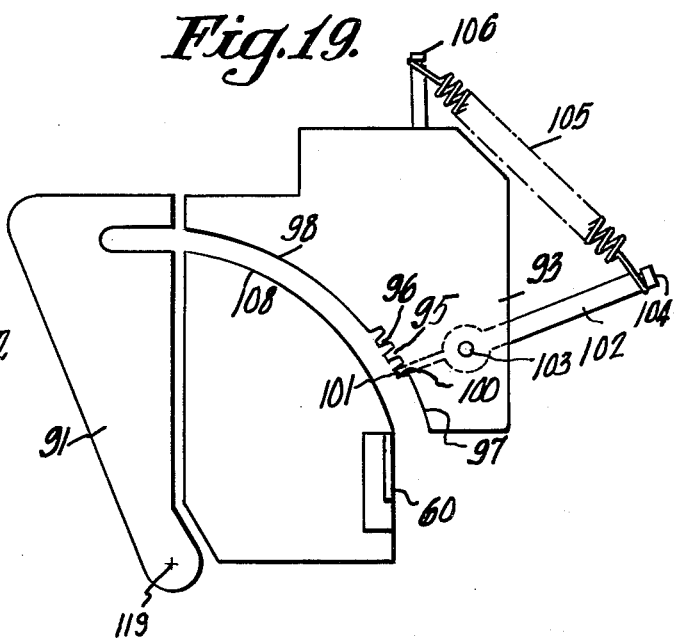

United States Patent Office 3,111,231
Patented Nov. 19, 1963

3,111,231
ARTICLE HANDLING APPARATUS
Herman W. Baer, Rochelle Park, N.J., assignor to Radio Corporation of America, a corporation of Delaware
Filed Feb. 10, 1961, Ser. No. 88,446
17 Claims. (Cl. 214—1)

This invention relates to apparatus for handling articles having a plurality of leads extending from one end thereof. The apparatus may be used to position articles, for example, transistors, having either short or long leads, which may be either flexible or stiff.

Transistors and their leads must be oriented to a predetermined position about an axis prior to certain processing steps. For example, prior to testing, transistors and their leads must be oriented and positioned and the leads inserted into a test socket. Such orienting and positioning was previously carried out by hand or with complicated apparatus. It is particularly difficult to orient transistors having long, flexible leads and to position the leads thereof because of the tendency of the leads to become entangled with one another or to become bent or kinked.

An object of the invention is to provide novel apparatus for handling articles.

Another object is to provide improved apparatus particularly suitable for positioning transistors or other articles having leads extending therefrom.

A further object is to provide apparatus for orienting and inserting transistor leads into test sockets.

The apparatus described herein may be used to orient and position transistors and other articles having at least three leads extending from one end thereof at positions located in equal spacing in only a portion of a circle about an axis.

In a general form, the apparatus of the invention comprises means adapted to hold an article therein with its leads extending therefrom in any random position, means for moving the article holding means along a prescribed path, and means, such as a gear segment, along the prescribed path adapted to engage those of said leads not already in a predetermined position. Upon engagement, the article is adjusted in the holding means, as by rotation, to bring the leads to a desired position.

In a particular form, the apparatus of the invention comprises a nest adapted to receive the article therein with the leads thereof extending from the nest in random orientation. The nest is rotatable about the aforementioned axis when the article resides therein. The particular apparatus includes a gear segment having at least as many teeth as the number of leads, and means are included for providing relative movement between the nest and the segment to move the article along a predetermined path closely spaced from the tops of the teeth of the gear segment. In this movement, leads not already in a predetermined orientation about the aforementioned axis engage the teeth of the segment. When the leads of the article engage the teeth of the gear segment, the article is rotated to the desired orientation about the axis, irrespective of the orientation of the article before such engagement.

In some forms of the invention, one lead may tend to jam on the leading tooth of the gear segment in some positions of the article. The tendency is eliminated by a further feature of the invention in which the first or leading tooth of the gear segment is of compound construction comprising a portion integral with the gear segment and, adjacent said integral portion, a pressure-yieldable portion having a smaller top angle than the integral portion. When a lead jams on the pressure-yieldable portion of the first tooth, the pressure-yieldable portion yields to the applied pressure engaging the lead with the integral portion of the first tooth at a position at which the lead does not jam.

Further in accordance with the invention, the foregoing orienting apparatus may be combined with means for inserting the article into the holding means, means for separating the leads after the leads are positioned, means for grasping and positioning the end of each of the leads, and means for both inserting the lead ends into a socket and for ejecting the article from the nest in its oriented position.

The invention is described in more detail in the following specification when read in connection with the accompanying drawings in which:

FIGURES 1 and 1a are, respectively, a side view and a sectional view taken on the line 1a—1a of FIG. 1 of a typical article which may be oriented by the apparatus of the present invention, FIGURES 2, 3, 4 and 5 are, respectively, front, side, back and top views of one form of apparatus in accordance with the invention, FIGURES 6 and 7 are partially sectional, enlarged, fragmentary side views of the nest, illustrating the functional sequence for inserting an article therein, FIGURES 8, 9, 10, 11 and 12 are fragmentary, front views showing the nest and gear segment and illustrating the functional sequence for orienting and positioning the article with respect to the path of travel of the nest, FIGURES 13 and 15 are fragmentary, front views, and FIGURES 14 and 16 are fragmentary, sectional views along section lines 14—14 and 16—16, respectively, of the nest and means for grasping and positioning the lead ends, illustrating the sequence for separating the leads, and holding and positioning the lead ends, FIGURE 17 is an enlarged, fragmentary, sectional view of the nest along sectional line 17—17 of FIGURE 15, illustrating the article being ejected therefrom and the leads of the article being inserted into a test socket, FIGURE 18 is a fragmentary, front view showing, in greater detail, the gear segment shown in FIGURES 8 to 12 and illustrating how one of the article leads may jam against the first or leading tooth of the gear segment.

FIGURE 19 is an enlarged, fragmentary front view including another form of gear segment having a compound first tooth in accordance with the present invention, and FIGURES 20 and 21 are enlarged, fragmentary, front views of the gear segment of FIGURE 19, illustrating the sequence of movement when an article lead jams on the pressure-movable portion of the first tooth.

Referring, now, more particularly to the drawings, there is shown, in FIGURES 1 and 2, a typical article 21 which may be oriented by the apparatus of the invention. The article 21 illustrated is a transistor and comprises a case or cap 22 closed at one end by a base or stem 23. Three long, flexible leads 24, 25 and 26 extend from the base 23 in a direction longitudinally of the case 22. The case 22 has a generally cylindrical shape and is about 0.23 inch in diameter and about 0.40 inch long.

The leads 24, 25 and 26 extend from the base 23 in generally parallel relation to one another at points on the base 23 located in equal spacing in only a portion of a circle 27 about 0.072 inch in diameter and having an axis 28 coaxial with the cylindrical case 22. In the article illustrated, the three leads are spaced at 90° intervals around a 180° arc of the circle 27, and remainder of the circle has no leads extending therefrom. The leads 24, 25 and 26 are of flexible metal about 0.017 inch in diameter, and are about equal in length, each being, say, at least 1.5 inch long.

The typical article 21 described above is referred to in the semiconductor art as JEDEC (Joint Electron Devices Engineering Council) Outline No. T0–1 which includes JEDEC Base No. E3–39.

While the apparatus is described herein with respect to loading completed transistors, cylindrical or other shaped articles for the same or other purposes may also be oriented by such apparatus. The significant characteristic of the article to be oriented is that it have at least three leads or similar structures extending from one end thereof in a generally parallel relationship from positions equally spaced along only a portion of a circle, so that the leads may be engaged and rotated by suitable means as a rack would rotate a pinion which has one or more missing teeth.

FIGURES 2, 3, 4 and 5 illustrate an apparatus 31 which includes a support 32 upon which all of the working structures of the apparatus are mounted. The apparatus 31 is driven by a motor 33. The motor power is transmitted through a drive pulley 34, a belt 35, a driven pulley 36, and thence through a friction clutch 38 to a camshaft 37.

The camshaft 37 is normally kept from rotating by a latch 39 (FIG. 4) held engaged in a slot 40 in the camshaft 37 by a spring 41. A solenoid 42 has an armature 43 connected to linkage 44 having a pin 45 adjacent the latch 39. When the armature 43 is drawn downwardly (as illustrated in FIGURE 4), the pin 45 raises the latch 39 out of the slot 40, permitting the camshaft 37 to rotate.

The camshaft 37 has mounted thereon five cams (FIGURES 3 and 5) which produce the motions required by the apparatus. In the order illustrated in FIGURE 3, starting with the cam closest the clutch 38, the cams are: the article ejecting cam 46, the nest slide cam 47, the article inserting cam 48, the horizontal lancing cam 49, and the vertical lancing cam 50.

A nest 51 is adapted to receive and hold an article 21 to be oriented and positioned with its leads extending therefrom in any random position. The nest is mounted at one end of a nest support arm 52 which is pivoted about a nest slide pivot pin 53 (shown in dotted outline in FIGURE 2). The nest proper is a suitably shaped bushing 69a (see FIG. 6) pressed into the central hole in the inner ring 69 of a ball bearing assembly. The other end of the nest support arm 52 is connected to a nest slide cam follower 58 (FIG. 2) through a nest slide linkage 54, a first nest slide arm 55, a nest slide shaft 56, and a second nest slide arm 57. The nest 51 is so positioned in the ball bearing that, when an article 21 is inserted in the nest 51, the article is rotatable about the axis 28 of the article 21.

A pair of parallel tracks 59 (FIG. 2) guide articles 21, in single file, to a position opposite the nest 51 determined by a stop 60. From this position, an article 21 is pushed into the nest by an inserting finger 61. The inserting finger 61 is mounted at one end of a finger support arm 62 (FIG. 3 and 6) which is pivoted about inserter pivot pin 63. The other end of the finger support arm 62 is connected to an article inserting cam follower 66 (FIG. 3) through an inserter linkage 64 and a pivoted inserter arm 65. As shown in FIGURE 3, when the article inserting cam follower 66 is moved upward with the article inserting cam 48, the inserting finger 61 moves forward, pushing an article 21 into the nest 51.

The nest assembly is shown in detail in FIGURE 6. The nest assembly comprises a ball bearing assembly held with set screws (not shown) in a hole in the nest support arm 52. The ball bearing assembly comprises a set of balls 67 on a center line 0.5 inch diameter between an outer ring 68 having an outside diameter of 0.88 inch and an inner ring 69 having an inside diameter of 0.32 inch. The inner wall of the outer ring 68 and the outer wall of the inner ring 69 define the ball races. The ball bearing is about 0.2 inch thick. The inner diameter of the inner ring 69 holds the bushing 69a having an outside diameter of about 0.32 inch and an inside diameter of about 0.23 inch. The bushing 69a defines the nest 51 which is a recess of a diameter to provide a close fit to the outer shape of the article 21. The recess extends from one side of the ball bearing to a nest shoulder 70 which functions as a stop for the travel of the article 21 during insertion. An ejecting hole 71 of smaller diameter than the nest 51 extends from the other side of the ball bearing to the nest. The ejecting hole 71 permits an ejecting finger 92 (described hereinafter) to enter the nest to push the positioned article 21 from the nest 51 at the end of the operating cycle.

The nest 51 is moved by the nest slide cam 47 in each cycle of operation from a lower position or station, where the article 21 is inserted into the nest, to an upper position or station, where the article 21 is ejected from the nest. The path of the nest between the lower and upper positions is arcuate. A stationary gear segment 93 is closely spaced along this path so that leads 24, 25 and 26 not in predetermined positions about the axis 28 engage the teeth of the gear segment, and are rotated to a desired position.

The gear segment 93 (shown in detail in FIGURE 12) is arcuate and comprises a toothed portion of equally deep teeth 94, 95 and 96 which correspond in number to the number of leads in the article to be oriented and have a chordal pitch (the lineal distance between the faces of adjacent teeth at the intersection of the pitch circle) about the same as the spacing between such leads. The gear segment 93 also comprises a first side portion 97 (on the same side as the lower position side of the nest) having no teeth and cut at least as deep as the root or dedendum circle (the deepest cut) of the toothed portion. The gear segment 93 also comprises a second side portion 98 (on the same side as the upper position side of the nest 51) having no teeth and being about the same height as the addendum circle (the top or point) of the toothed portion. An opposing member 108 faces the teeth and side portions of the gear segment 93.

A lance 72 (FIGS. 2 and 12–16) is screwed on a lance support 73 which is bolted, in turn, on a vertical movement support 74 slidably supported on vertical slide bars 80, a horizontal movement support 74a and horizontal slide bars 75 (shown in FIGURES 2 and 5). A horizontal motion is imparted to the lance 72 by the horizontal lancing cam 49 through a horizontal lancing cam follower 76 (FIG. 5) mounted at one end of a horizontal lancing arm 77 which is pivotally mounted on a horizontal lancing arm pin 78. A base pin 79 is mounted on the base 74 and extends between two spaced fingers 77a at the other end of a horizontal lancing arm 77. The horizontal movement support is screwed to horizontal slide bars 75, which slide in journals (not shown) mounted on the support 32.

The vertical movement support 74 is mounted at the lower end of the two vertical slide bars 80 which are held in position at their upper end by a crosspiece 81 (FIG. 2). The vertical slides may be moved in a vertical direction in journals in the horizontal movement base 74a. A vertical motion is imparted to the lance 72 by the vertical lancing cam 50 which produces vertical motion in a vertical lancing cam follower 82 (FIG. 2) centrally mounted on a vertical lancing cam follower arm 83. The vertical lancing arm 83 is pivoted at one end by a pin 84. The vertical motion is transmitted to the lance 72 (and its entire assembly) through a linkage 85 connected to the other end of the vertical lancing cam follower arm 83, a vertical lancing arm 86 pinned at one end to the arm 83 and mounted on a pivot 87, and a vertical lancing pin 88 mounted on the cross piece 81 and extending between two spaced fingers at the other end of the vertical lancing arm 86.

The lance 72 is fork shaped at its lower end and has a number of tines pointing downwardly. The points of the tines are spaced so that they will enter the spaces between the leads 24, 25, and 26 of the article 21 after the article has been oriented and positioned. The slots between the tines are so shaped as to give the desired spreading of the leads 24, 25, 26 when the lance moves away from the nest 51 and downwardly. A guide bar 89 is mounted on one horizontal slide 75 so that the bar follows the horizontal motion of the base 74 but not the vertical motion. The ejecting finger 92 is connected to an ejecting finger support 109 (FIGS. 3 and 5). The ejecting finger support 109 is slidably mounted on the horizontal slides 75. A horizontal motion is imparted to the ejecting finger support 109 by the article ejecting cam 46 through ejecting cam follower 110 and an ejecting arm 111 which is pivoted on ejecting arm pin 112. One end of the ejecting arm 111 has fingers 113 which straddle an ejecting finger support pin 114 in the ejecting finger support 109. The ejecting finger support 109 also has a door opener finger 120 extending toward a door 91 adjacent the gear segment 93 and the opposing member 108. The door 91 is pivotally mounted on an axis 119 and has an inclined flange (not shown) facing the door opener finger 120. When the support 109 moves horizontally the door opener finger 120 bears on the flange and the door 91 is opened by counter clockwise rotation.

The operation of the apparatus of FIGURES 2 to 5 will now be described in connection with FIGURES 6 to 17, which show salient steps in the operation of the apparatus. Articles 21, such as transistors, are fed in along the track 59, one at a time, in side by side fashion until the leading article is against the stop 60. This is shown in FIGURE 6. With the motor 33 running at constant speed, the apparatus is started through one cycle when a switch (not shown) is closed to energize the solenoid 42 (FIG. 4) which draws down the armature 43 and raises the latch 39 from the slot 40. The camshaft 37 now rotates through one cycle. During the cycle, the latch 39 rides on the outside of the camshaft 37 until it drops into the slot 40 and stops the camshaft 37 after one rotation thereof.

The camshaft 37 rotates each of the five cams which are designed and positioned for carrying out the following operational sequence:

First, the article inserting cam 48, through the described linkage, moves the inserter finger 61 forward. The finger 61 pushes the leading article 21 into the nest 51 (FIG. 6) so that the top of the article 21 is against the shoulder 70 and the leads thereof extend from the nest 51, as shown in FIGURE 7. The inserter finger 61 is now retracted, leaving the article in the nest in random orientation about its axis 28 in the position shown, by way of example, in FIGURE 8, which is a front view of the nest 51 with the article nested in it.

Next, the nest slide cam 47, through the described linkage 54 and arms 55 and 57, moves the nest 51 with the article 21 in it along an arcuate path from the lower position shown in FIGURE 8 to the upper position shown in FIGURE 12. As the article 21 is moved along this path, one of the leads, for example, the lead 24, engages the first tooth 94. A rotational moment is produced by the force moving the article 21 and nest 51 and the distance between the center of rotation 28 of the nest 51 and the point of contact between the tooth 94 and the lead 24. The rotational moment rotates the article 21 and nest 51 in a clockwise direction as shown by the arrow in FIGURE 9. The article 21 and the nest 51 continue to rotate when the remaining leads 25 and 26 engage the other teeth 95 and 96, until the leads no longer engage the teeth, as shown in sequence in FIGURES 9, 10 and 11. In the final orientation, the leads 24 and 26 are adjacent the second side portion 98 of the gear segment 93. This occurs regardless of which lead is first to engage the first tooth 94. The action is somewhat like a pinion having a missing tooth which is rotated by a rack until the absence of the tooth disengages the two. Since the tooth is missing, the pinion always is brought to the same rotational position with respect to the rack.

The operation is described with respect to an article whose lead 24 engages the first tooth 94. If, however, the article 21 is in a position where the lead 25 engages the first tooth 94, the article 21 is rotated by only the teeth 94 and 95 to the orientation where the leads 24 and 26 are adjacent the second side portion 98 of the gear segment 93. Similarly, if the lead 26 engages the first tooth 94, the article 21 is rotated by only the tooth 94 to the same orientation. There is a position in which none of the leads engage the first tooth 94. This is the position where the article 21 is, by chance, in the position of final orientation. In such case, the article passes through without rotation by the teeth of the gear segment.

It will be noted that the second side portion 98 of the gear segment 93 is at the height of the top of the teeth in the segment. This portion is spaced from the opposing member 108 to form a path which maintains the article 21 in its finally oriented position with respect to the portion 98. The article 21 and nest 51 come to rest, as shown in FIGURE 12, at the upper position just below the lance 72 with the open side of the lead circle 27 facing upwardly toward the lance. The door 91 remains closed until the article 21 is ready to be ejected from the nest. The door 91 fuctions to keep articles 21, which are held loosely in the nest 51, from falling out, or from being pulled out when the lead ends are being positioned.

After the article 21 has been oriented, it is necessary to separate, grasp, and position the ends of the leads in their proper positions, and then to eject the article 21 in its oriented position in a manner such that the lead ends are moved in a controlled manner. To achieve this, as shown in FIGURES 12 to 17, the lance 72 is lowered so that the ends of the tines 99 pass between, and are interdigitated with, the leads thereby locating each lead near the base 23 of the article 21. Then, the lance 72 moves away from the nest (toward the viewer in FIGURES 13 and 15 and to the left in FIGURES 14 and 16) and further downward, as shown in FIGURES 15 and 16. This movement is shown by the dotted lines in FIGURE 16. The guide bar 89 moves horizontally with the lance 72 but not vertically so that the ends of the leads 24, 25 and 26 become trapped in the crotches between the tines. At this point, the ends of the leads 24, 25 and 26 are held and positioned in definite order and location opposite a test socket 90 which has been located opposite the nest by means outside the apparatus 31 of this invention.

Then, actuated by the ejecting cam 46, the door 91 is opened by a finger 120 and the ejecting finger 92 pushes the article 21 out of the nest 51 and, at the same time, pushes the leads into the socket 90 in the desired order. Finally, each of the structures returns to its starting position in reverse order and the apparatus is ready for a new cycle.

An important feature of the invention is the positioning mechanism which comprises the nest 51, the gear segment 93 and means for moving the nest 51 with the article 21 therein along a prescribed path adjacent the teeth of the gear segment so that the leads of the article 21 engage the teeth of the segment 93 and are rotated to the desired orientation, as described above.

The mechanics of the rotation are analyzed below in connection with the vector diagram in FIGURE 18. When a lead (for example, lead 24) engages the front tooth 94 at a point 107, a force P is produced at the point of contact between the lead 24 and the tooth 94 in a direction opposite to the path of travel of the nest. The force P may be divided into two components, viz., a force N from the point of contact through the center of rotation 28 of the nest 51, and a force S perpendicular to the force N. The force N is at an angle $\alpha$ away from the force P. Thus, N equals $P \cos \alpha$ and S equals $P \sin \alpha$.

The force N produces no rotational moment on the nest 51 because there is no moment arm. The force S produces a rotational moment on the nest 51 equal to $Sd$, where the moment arm $d$ is the distance between the point of contact 107 and the center of rotation 28, which is identical with the axis of the article 21.

The face of the tooth 94 is at an angle $\beta$ from the component force S. The most severe condition is where $\beta$ equals zero. This is the condition which is now considered, i.e., where the tooth face is perpendicular to the component force N.

The rotational moment is resisted by the sliding friction F between the lead 24 and the front tooth 94 acting through the moment arm $d$. Then, F equals $N\mu'$, where $\mu'$ is the coefficient of sliding friction between the lead 24 and the tooth 94. With increasing values of $\beta$, $\mu'$ becomes smaller. The rotational moment is further resisted by the friction of the bearing assembly in the nest which is expressed $N\nu\mu''$, where $\nu$ is the radius of the bearing assembly and $\mu''$ is the coefficient of friction of such bearing assembly. For ball bearings, $\mu''$ averages about 0.001.

The net value, $\Sigma$, of rotational moments is:

$$\Sigma = Sd - Fd\mu' - N\nu\mu''$$
$$\therefore \Sigma = dP \sin \alpha - P \cos \alpha(\mu'd + \mu''\nu)$$

From the foregoing analysis, it can be seen that it is desirable to provide an apparatus with the smallest values of $\mu'$ and $\mu''$ and the largest values of $d$, $\alpha$, and $\beta$. The smallest value of $\mu'$ is best provided by a judicious choice of the material for the gear segment, because the material of the leads is generally determined by other considerations. The smallest value of $\mu''$ is best provided by the proper selection of a ball bearing, as opposed to other types of bearings. The value of $d$ is determined by the design of the article to be oriented. The value of $\alpha$ is determined by the tolerance in the angle of orientation, the smaller the tolerance, the smaller the angle $\alpha$. It is desirable to have some friction $\mu''$ in the bearing assembly so that, when the article and nest are rotated, the rotation will stop as soon as the force P is removed; that is, there will be little or no over-rotation by the nest.

In some apparatus, there is a set of conditions where $\Sigma$ is zero or negative, even where the slope of the face and the top of the tooth provide a positive value for $\Sigma$. The most severe condition is in that part of the transition between the face and the top of the tooth, where $\beta$ equals zero. In such a condition, the lead may jam on the tooth.

Jamming of this type may be overcome by the use of a compound first or leading tooth on the gear segment 93. In such compound tooth, there is a portion integral with the gear segment and an adjacent portion which yields under pressure. The integral and pressure-yieldable portions of the compound tooth have different top angles and the transition regions between the face and the top of the tooth portions do not overlap. The pressure-yieldable tooth portion is normally engaged by the lead ahead of the integral tooth, which is stationary. When a lead jams on the pressure-yieldable portion, the pressure-yieldable tooth is depressed, presenting the integral portion of the tooth to the lead at a position on the integral portion which is non-jamming.

FIGURE 19 illustrates an arrangement having a compound first tooth. The arrangement is identical to that of FIGURE 12 except that the first tooth is of compound construction. There is a portion 100 integral with the gear segment. The integral portion of the first tooth has a face angle of 30° and a top angle of 30°. As used herein, the top angle of a gear tooth is the angle between the top of the tooth and the tangent to the addendum circle at the centerline of the tooth. The face angle of the tooth is the angle between the radius of the addendum circle and the face of the tooth at the point of interest.

There is also a portion 101 which is movable under pressure. The movable portion 101 has a face angle of 0° and a top angle of 0°. The movable portion 101 is one end of a lever 102 which is supported on and pivots on a pivot pin 103. The other end 104 of the lever 102 is held by a spring 105 supported on a support pin 106. Thus, the pressure-movable portion 101 may also be described as pressure yieldable, spring-biased, or movable under pressure.

The operation of the apparatus of FIGURE 19 is the same as that of the embodiment of FIGURES 8 to 11 except where a lead jams on the first tooth. That special condition is illustrated in FIGURES 20 and 21. As shown in FIGURE 20, a lead 24 has jammed on the transition region between the face and top of the pressure movable portion 101 of the front tooth. Further application of pressure by the movement of the nest will not rotate the article 21. However, as shown in FIGURE 21, the pressure-movable portion 101 yields to the pressure by the extension of the spring 105 holding the other end 104 of the lever 102. The motion of the tooth portion 101 presents the integral portion 100 of the tooth, which has larger top angle and a different location of the transition region between the face and top of the tooth than the movable portion 101. The lead 24 contacts the top of the integral portion 100, is moved counterclockwise, and orientation commences. An essential feature of the embodiment of FIG. 19 is that the movable portion 101 has a smaller top angle than the integral portion 100, thereby presenting a jam free surface when the movable portion yields to jamming pressure.

There have been described two embodiments of improved apparatus for manufacturing semiconductor devices and particularly for orienting transistors. The apparatus may be used in various combinations for feeding, orienting, and inserting into test sockets transistors or other electronic components having a plurality of leads requiring suitable orientation relative to such sockets. Although two forms of apparatus according to the present invention have been described herein, it should be apparent to those skilled in the art that various modifications thereof are possible within the scope of this invention. Hence, it is desired that the foregoing shall be taken as illustrative only and not in a limiting sense.

What is claimed is:

1. Apparatus for positioning an article having a plurality of leads extending therefrom to dispose said articles with its leads in a predetermined position, said apparatus comprising a freely-rotatable article-holding means adapted to hold an article therein with its leads extending therefrom in any random position, means for moving said holding means along a prescribed path, and means along said path adapted to engage those of said leads not in a predetermined position and to rotate said article and said holding means to bring said leads to a predetermined position.

2. Apparatus for positioning an article having a plurality of leads extending therefrom to dispose said article with its said leads in a predetermined position, said apparatus comprising a freely-rotatable article holding means movable from one to the other of a receiving station and a discharging station, said holding means being adapted to receive an article therein with said leads extending therefrom in any random position, means for moving said holding means from said receiving station to said discharging station along a prescribed path, and means along said path adapted to engage said extending leads as said holding means moves along said path and to rotate said article and said holding means to bring said leads into a predetermined position.

3. Apparatus for positioning the leads of an article having at least three leads extending from one end of said article at positions located in equal spacing in only a portion of a circle about an axis, said apparatus comprising a freely-rotatable nest adapted to hold said article with the leads thereof extending from said nest in any random position about said axis, a gear segment having at least as many teeth as the number of said leads, and means providing relative movement between said nest and said segment to engage leads not in a predetermined position about said axis with the teeth of said segment and to rotate said article and said nest about said axis to bring said leads to a predetermined position.

4. Apparatus for positioning the leads of an article having at least three leads extending from one end of said article at positions located in equal spacing in only a portion of a circle about an axis, said apparatus comprising a nest adapted to hold said article with the leads thereof extending from said nest in any random position about said axis, a gear segment having at least as many teeth as the number of said leads and having one tooth of compound construction, said one tooth comprising a portion integral with said segment and, adjacent said integral portion, a pressure yieldable portion having a smaller top angle than that of said integral portion, and means for moving said nest with respect to said segment whereby to engage leads not in a predetermined position about said axis with the teeth of said segment whereby said article is rotated about said axis to bring said leads to a predetermined position.

5. Apparatus for positioning the leads of a cylindrical article of the type having at least three leads of substantially equal length equally spaced from each other in only a portion of a circle about the axis of said cylinder and extending from one end of said article, said apparatus comprising a nest adapted to receive said article with said leads extending therefrom, said nest being rotatable on the axis of said device when said device resides therein; a stationary, arcuate gear segment having the same number of teeth therein as the number of leads extending from said nest, said teeth having a chordal pitch about equal to said spacing of said leads; and means for moving said nest along an arcuate path closely spaced from and parallel to the outside diameter circle of said teeth to engage said teeth with leads that are not in a predetermined position.

6. Apparatus for positioning the leads of an article having at least three leads extending longitudinally from one end of said article at positions located in equal spacing in only a portion of a circle about an axis, said apparatus comprising a nest adapted to hold said article with said leads extending from said nest in any random position about said axis mounting means for said nest whereby said nest is freely rotatable on said axis when said article is held therein; means for inserting said article into said nest; a stationary, arcuate gear segment having a toothed portion of equally deep teeth which correspond in number to the number of leads in said article and having a chordal pitch about the same as said spacing between said leads, a first side portion on the one side of said toothed portion, said first side portion having no teeth and being at least as deep as the dedendum circle of said toothed portion, and a second side portion on the other side of said toothed portion, said second side portion having no teeth and being about the same depth as the addendum circle of said toothed portion; and means for moving said nest with said article therein adjacent said segment along a predetermined path closely spaced from and parallel to the addendum circle of said segment, first adjacent said first side portion, then adjacent said toothed portion whereby leads not in a predetermined position engage the teeth of said segment and said article is rotated about said axis to a predetermined position, and then adjacent said second side portion.

7. Apparatus for positioning the leads of an article having at least three leads extending longitudinally from one end of said article at positions located in equal spacing in only a portion of a circle about an axis, said apparatus comprising a nest adapted to hold said article with said leads extending from said nest in any random position about said axis; mounting means for said nest whereby said nest is freely rotatable on said axis when said article is held therein; means for inserting said article into said nest at an insertion station for said nest; a stationary, arcuate gear segment having a toothed portion of equally deep teeth which correspond in number to the number of leads in said article and having a chordal pitch about the same as said spacing between said leads, a first side portion on the one side of said toothed portion, said first side portion having no teeth and being at least as deep as the dedendum circle of said toothed portion, and a second side portion on the other side of said toothed portion, said second side portion having no teeth and being about the same depth as the addendum circle of said toothed portion; means for moving said nest with said article therein from said insertion station to an ejection station along a predetermined path closely spaced from and parallel to said outside diameter circle of said segment, first adjacent said first side portion, then adjacent said toothed portion whereby leads not in a predetermined position engage the teeth of said segment and said article is rotated about said axis to bring said leads to a predetermined position, and then adjacent said second side portion to said ejection station; a finger opposite said axis at said ejection position, and means for moving a finger along said axis to eject said article from said nest.

8. Apparatus for positioning the leads of an article having at least three leads extending longitudinally from one end of said article at positions located in equal spacing in only a portion of a circle about an axis, said apparatus comprising a nest adapted to hold said article with said leads extending from said nest in any random position about said axis; mounting means for said nest whereby said nest is freely rotatable on said axis when said article resides therein; means for inserting said article into said nest; and a stationary, arcuate gear segment having a toothed portion of equally deep teeth which correspond in number to the number of leads in said article and having a chordal pitch about the same as said spacing between said leads, a first side portion on the one side of said toothed portion, said first side portion having no teeth and being at least as deep as the dedendum circle of said toothed portion, and a second side portion on the other side of said toothed portion, said second side portion having no teeth and being about the same depth as the addenum circle of said toothed portion, the tooth adjacent said first side portion being of compound construction comprising a portion integral with said segment and, adjacent said integral portion, a portion movable under pressure, said movable portion having a smaller top angle than said integral portion.

9. Apparatus for positioning an article having a plurality of leads extending therefrom to dispose said article with its leads in a predetermined position, said apparatus comprising a freely-rotatable article-holding means adapted to hold an article therein with its leads extending therefrom in any random position, means for inserting said article in said article holding means, means for moving said holding means along a prescribed path, and means along said path adapted to engage those of said leads not in a predetermined position and to rotate said article and said holding means to bring said leads to a predetermined position.

10. Apparatus for positioning an article having a plurality of leads extending therefrom to dispose said article with its leads in a predetermined position, said apparatus comprising a freely-rotatable article-holding means adapted to hold an article therein with its leads extending therefrom in any random position, means for inserting said article in said article holding means, means for moving said holding means along a prescribed path, means along said path adapted to engage those of said leads not in a predetermined position and to rotate said article and said holding means to bring said leads to a predetermined position and means for ejecting said article from said article-holding means in said predetermined position.

11. Apparatus for positioning an article having a plurality of leads extending therefrom to dispose said article with its leads in a predetermined position, said apparatus comprising article-holding means adapted to hold an article therein with its leads extending therefrom in any random position, means for inserting said article in said article holding means, means for moving said holding means along a prescribed path, means along said path adapted to engage those of said leads not in a predetermined position and to adjust said article in said holding means to bring said leads to a predetermined position, means for grasping and positioning the end of each of said leads, and means for both inserting the lead ends into a socket therefor and for ejecting said article from said article-holding means in said predetermined position.

12. Apparatus for positioning the leads of an article having at least three leads extending longitudinally in generally parallel relation from one end of said article at positions located in equal spacing in only a portion of a circle about an axis; said apparatus comprising a nest adapted to hold said article with said leads extending from said nest in any random position about said axis; mounting means for said nest whereby said nest is freely rotatable on said axis when said article resides therein; means for inserting said article into said nest at an insertion station for said nest; a stationary, arcuate gear segment having a toothed portion of equally deep teeth which correspond in number to the number of leads in said article and having a chordal pitch about the same as said spacing between said leads, a first side portion on the one side of said toothed portion, said first side portion having no teeth and being at least as deep as the dendendum circle of said toothed portion, and a second side portion on the other side of said toothed portion, said second side portion having no teeth and being about the same depth as the addendum circle of said toothed portion, the tooth adjacent said first side portion being of compound construction comprising a portion integral with said segment and, adjacent said integral portion, a portion movable under pressure, said movable portion having a smaller top angle than that of said integral portion; means for moving said nest with said article therein from said insertion station along a predetermined path closely spaced from and parallel to said circle of said segment, first adjacent said first side portion, then adjacent said toothed portion whereby leads not in a predetermined position about said axis engage the teeth of said segment and said article is rotated on said axis to a predetermined position, and then adjacent said second side portion to said ejection station, a finger opposite said axis at said ejection position, and means for moving said finger along said axis to eject said article from said nest.

13. Apparatus for positioning the leads of an article having at least three leads extending from one end thereof at positions located in equal spacing in only a portion of a circle about an axis, said apparatus comprising a nest adapted to hold said article with the leads thereof extending from said nest in any random position about said axis; a gear segment having at least the same number of teeth as the number of said leads; means providing relative movement between said nest and said segment to engage leads not in a predetermined position about said axis with the teeth of said segment whereby said article is rotated on said axis to bring said leads to a predetermined position; a lance having a plurality of tines spaced according to said leads; means for moving said lance to a position close to said article with said tines interdigitated with said leads; and means for further moving said lance until the end of each of said leads resides in a different crotch between two of said tines.

14. Apparatus for positioning the leads of an article having at least three leads extending from one end thereof from positions located in equal spacing in only a portion of a circle about an axis, said apparatus comprising a nest adapted to hold said article with said leads extending from said nest in any random position about said axis; mounting means for said nest whereby said nest is rotatable on said axis when said article resides therein; means for inserting said article into said nest; a gear segment having at least as many teeth as the number of said leads; means providing relative movement between said nest and said segment to engage leads not in a predetermined position about said axis with the teeth of said segment whereby said article is rotated about said axis to bring said leads to a predetermined position; a lance having a plurality of tines spaced according to said leads; means for moving said lance to a position close to said article with said tines interdigitated with said leads; means for further moving said lance until the end of each of said leads resides in a different crotch between two of said tines; and means for ejecting said article from said nest.

15. Apparatus for positioning the leads of a cylindrical article of the type having at least three leads of substantially equal length, equally spaced from each other in only a portion of a circle about the axis of said cylinder and extending longitudinally in generally parallel relation from one end of said article, said apparatus comprising a nest adapted to hold said article with said leads extending from said nest in any random orientation about said axis, said nest being freely rotatable on said axis when said article resides therein; means for inserting said article into said nest with said leads extending from said nest; a stationary, arcuate gear segment having the same number of teeth therein as the tumber of leads extending from said nest, said teeth having a chordal pitch about equal to said spacing of said leads; means for moving said nest along an arcuate path closely spaced from and parallel to the addendum circle of said teeth whereby leads not in a predetermined orientation about said axis engage the teeth of said segment and said article is rotated on said axis to bring said leads to a predetermined position; a lance having a plurality of tines spaced according to said leads; means for moving said lance with said article at said predetermined position in a direction substantially perpendicular to said axis to a position close to the cylindrical portion of said article with said tines interdigitated with said leads; means for further moving said lance in a direction parallel to said axis a distance less than the length of said leads; means for holding the end of each of said leads in a different crotch between two of said tines; and means for ejecting said article from said nest.

16. Apparatus for positioning the leads of an article having at least three leads extending from one end of said article at positions located in equal spacing in only a portion of a circle about an axis, said apparatus comprising a nest adapted to hold said article with the leads thereof extending from said nest in any random position about said axis, a gear segment having at least as many teeth as the number of said leads, said gear segment having one tooth of compound construction, said one tooth comprising a portion integral with said segment and, adjacent said integral portion, a yieldable portion having a smaller top angle than that of said integral portion, and means providing relative movement between said nest and said segment to engage leads not in a predetermined position about said axis with the teeth of said segment whereby said article is rotated about said axis to bring said leads to a predetermined position.

17. Apparatus for positioning the leads of an article having at least three leads extending from one end of said article at positions located in equal spacing in only a portion of a circle about an axis, said apparatus comprising a nest adapted to hold said article with the leads thereof extending from said nest in any random position about said axis, a gear segment having at least as many teeth as the number of said leads, said gear segment having one tooth of compound construction, said one tooth comprising a portion integral with said segment and, adjacent said integral portion, a spring-biased portion having a face angle of about 0° and a top angle of about 0° and said integral portion having a face angle of about 30° and a top angle of about 30°, and means providing relative movement between said nest and said segment to engage leads not in a predetermined position about said axis with the teeth of said segment whereby said article is rotated about said axis to bring said leads to a predetermined position.

References Cited in the file of this patent

UNITED STATES PATENTS

| | | |
|---|---|---|
| 2,609,912 | Engel | Sept. 9, 1952 |
| 2,804,187 | Worth | Aug. 27, 1957 |
| 2,821,810 | Bullers | Feb. 4, 1958 |
| 2,830,462 | Vettese | Apr. 15, 1958 |
| 2,876,325 | Baffrey | Mar. 3, 1959 |
| 2,997,185 | Morean | Aug. 22, 1961 |
| 3,021,938 | Cadwallader | Feb. 20, 1962 |
| 3,028,020 | Peras | Apr. 3, 1962 |

OTHER REFERENCES

I.B.M. Technical Vol. 1, No. 6, April 1959, Disclosure Bulletin.